United States Patent [19]

Awdeh et al.

[11] Patent Number: 5,754,530
[45] Date of Patent: May 19, 1998

[54] FLOW CONTROL OF ABR TRAFFIC IN ATM NETWORKS

[75] Inventors: Ra'ed Y. Awdeh, Ottawa; Osama Aboul-Magd, Nepean, both of Canada

[73] Assignee: Northern Telecom Limited, Montreal, Canada

[21] Appl. No.: 634,488

[22] Filed: Apr. 18, 1996

[51] Int. Cl.$^6$ .................................................. H04L 12/26
[52] U.S. Cl. ........................ 370/232; 370/234; 370/395
[58] Field of Search ................................. 370/229–238, 370/395, 465, 468

[56] References Cited

U.S. PATENT DOCUMENTS 5,633,859  5/1997  Jain et al. ............................. 370/234

OTHER PUBLICATIONS

G. Ramamurthy et al., "Analysis of the Adaptive Rate Control for ABR Service in ATM Networks," GLOBECOM '95 Communications for Global Harmony, IEEE Global Telecommunications, Issue 2, pp. 1083–1088, May 1995.

Nanying Yin et al., "Analysis of a Rate–Based Traffic Management Mechanism for ABR Service," GLOBECOM '95 Communications for Global Harmony, IEEE Global Telecommunications, Issue 2, pp. 1076–1082, May 1995.

Kai–Yeung Siu et al., "Adaptive Proportional Rate Control for ABR Service in ATM Networks," Computers and Communications, 1995 International, Phoenix Conference, pp. 529–535, Jul. 1995.

Danny H. K. Tsang et al., "A New Rate–Based Switch Algorithm for ABR Traffic to Achieve Max–Min Fairness with Analytical Approximation and Delay Adjustment," INFOCOM '96, vol. 3, pp. 1174–1181, 1996.

"ATM Forum Traffic Management Specification, Version 4.0" (Draft), S.S. Sathaye, ATM Forum/95–00113R9, Dec. 1995.

"Enhanced PRCA (Proportional Rate–Control Algorithm)", L. Roberts, ATM Forum/94–0735R1, Aug. 1994.

"NIST ER Switch Mechanism (An Example)", N. Golmie et al., ATM Forum/95–0695, Jun. 1995.

"Intelligent Congestion Control for ABR Service in ATM Networks", K.–Y. Siu and H.–Y. Tzeng, Computer Communication Review, vol. 24, No. 4, pp. 81–106, Oct. 1995.

"Example Switch Algorithm for Section 5.4 of TM Spec.", A. Barnhart, ATM Forum/95–0195, Feb. 1995.

"A Sample Switch Algorithm", R. Jain et al., ATM Forum/95–0178R1, Feb. 1995.

"ERICA+: Extensions to the ERICA Switch Algorithm", R. Jain et al., ATM Forum/95–1346, Oct. 1995.

"The Rate–Based Flow Control Framework for the Available Bit Rate ATM Service", F. Bonomi and K. Fendick, IEEE Network, vol. 9, No. 2, pp. 25–39, Mar./Apr. 1995.

*Primary Examiner*—Melvin Marcelo
*Attorney, Agent, or Firm*—Yoshiharu Toyooka

[57] ABSTRACT

An ATM network carries several categories of services, each having its own traffic characteristics and performance requirements. The ABR (available bit rate) service category is the only existing one suited for high-reliability data communications, such as file transfer, LAN emulation, etc. The invention relates to the control of ABR traffic flow in an ATM network, to quickly utilize the bandwidth left unused by higher priority service categories while minimizing ABR cell loss, and maintaining fairness among ABR connections. On each ABR connection, the source end system periodically sends RM (resource management) cells to the corresponding destination end system which loops them back to the source. The ATM network may instruct the ABR sources of the exact rates it can support by modifying a certain field in the RM cells. The invention relates to techniques of deriving the proper explicit cell rate for each ABR connection.

33 Claims, 10 Drawing Sheets

RM (Resource Management) Cell Format [1]

| FIELD | | OCTET | BIT(s) | NAME |
|---|---|---|---|---|
| Header | | 1-5 | all | ATM Header |
| ID | | 6 | all | Protocol ID |
| Type | DIR | 7 | 8 | Direction |
| | BN | 7 | 7 | BECN Cell |
| | CI | 7 | 6 | Congestion Indication |
| | NI | 7 | 5 | No Increase |
| | RA | 7 | 4 | Request/Acknowledge |
| | | 7 | 3-1 | Reserved |
| ER | | 8-9 | all | Explicit Cell Rate |
| CCR | | 10-11 | all | Current Cell Rate |
| MCR | | 12-13 | all | Minimum Cell Rate |
| QL | | 14-17 | all | Queue Length |
| SN | | 18-21 | all | Sequence Number |
| Reserved | | 22-51 | all | Reserved |
| Reserved | | 52 | 16-11 | Refer to I.371 |
| CRC-10 | | 52-53 | 10-1 | Refer to I.371 |

FIG. 1

| Field | Set by source to | May be altered by switches | May be altered by destinations |
|---|---|---|---|
| DIR | 0 | no | yes, should be (to 1) |
| MCR | ACR | no | no |
| ER | PCR (typically) | yes (reduced) | yes (reduced) |

FIG. 2

- - - → data flow
——→ RM cell flow (forward direction)
←—— RM cell flow (backward direction)

FLOW CONTROL OF ABR TRAFFIC IN ATM NETWORKS

FIELD OF THE INVENTION

This invention relates generally to a flow control mechanism in a connection-oriented packet-switched network. In particular, it is directed to a novel flow control mechanism for ABR (available bit rate service) traffic in ATM (asynchronous transfer mode) networks.

BACKGROUND OF THE INVENTION

ATM is a high speed connection oriented packet switching technique where information is organized into fixed length packets, called cells. In general terms, an ATM network is a collection of end systems interconnected through one or more ATM switches. On a connection, generally, an end-system both sends data to the other end systems on the network involved in the connection, and receives data from other end systems on the network involved in the connection. When an end system is a sender of data, it is referred to as a source; it is referred to as a destination when it is a receiver of data. Typically an end system acts as both source and destination.

The following documents are referred to as prior art;

[1] "ATM Forum Traffic Management Specification, Version 4.0" (Draft), S. S. Sathaye, ATM Forum/95-0013R9, December 1995.

[2] "Enhanced PRCA (Proportional Rate-Control Algorithm)", L. Roberts, ATM Forum/94-0735R1, August 1994.

[3] "NIST ER Switch Mechanism (An Example)," N. Golmie et al., ATM Forum/95-0695, June 1995.

[4] "Intelligent Congestion Control for ABR Service in ATM Networks," K.-Y. Siu and H.-Y. Tzeng, Computer Communication Review, Vol. 24, No. 4, pp. 81–106, October 1995.

[5] "Example Switch Algorithm for Section 5.4 of TM spec." A. Barnhart, ATM Forum/95-0195, February 1995.

[6] "A Sample Switch Algorithm," R. Jain et al, ATM Forum/95-0178R1, February 1995.

[7] "ERICA+: Extensions to the ERICA Switch Algorithm," R. Jain et al, ATM Forum/95-1346, October 1995.

[8] "The Rate-Based Flow Control Framework for the Available Bit Rate ATM Service," F. Bonomi and K. Fendick, IEEE Network, Vol. 9, No. 2, pp. 25–39, March/April 1995.

According to [1] above, five service categories, differing in traffic characteristics and/or service guarantees, are defined for ATM networks. They are: (1) CBR (constant bit rate); (2) rt-VBR (real-time variable bit rate); (3) nrt-VBR (non-real-time variable bit rate); (4) UBR (unspecified bit rate); and (5) ABR (available bit rate).

ABR is the most recent among the above service categories. ABR is intended mainly for non-real-time data applications with varying and/or unknown bandwidth requirements and which cannot be easily characterized in terms of a peak cell rate, a sustainable cell rate, and a maximum burst size. Furthermore, it is the only one among the above service categories that is inherently closed loop. Example types of applications for ABR are any UBR application for which the user wants a more reliable service, critical data transfer (e.g. defense information), super computer applications and data communications applications requiring better delay behavior, such as remote procedure call, distributed file service (e.g. NFS), or computer process swap/paging [1].

The source of an ABR VC (virtual connection) periodically creates and sends special control cells called RM (resource management) cells which travel through the same path as data cells of the VC all the way to the destination of that VC. The destination then loops these cells back to the source through the same path. When an RM cell is traveling from the source to the destination, it is referred to as a forward RM cell; when it is traveling from the destination to the source, it is referred to as a backward RM cell. FIG. 1 shows an RM cell with all of its fields. FIG. 2 shows those fields which have bearings on the present invention. As seen in FIG. 2, some of these fields are intended for information-sharing only and are thus read-only fields and others are read/write fields which may be modified by intermediate switches and/or the destination.

The source adjusts its ACR (allowed cell rate) based on the feedback carried by returning RM cells. ACR represents the rate the source is using to control its cell transmission for VC. The value of a particular forward RM cell is inserted in that cell's CCR field at the time of its transmission. It is expected that end systems which comply with the source and destination reference behaviors as recommended by the above-cited ATM Forum Specification [1], will experience a low cell loss ratio and obtain a fair share of the available bandwidth. According to one definition, a fair share for a VC will be a function of its MCR (minimum cell rate) that is negotiated during connection setup, as well as the MCRs of the other VCs sharing with it one or more links.

Five different fairness criteria are described in Section I.3 of [1]. The first criterion (called "Max-Min") only applies to the case where all ABR VCs are unweighted (or equally weighted) and with zero MCRs; both restrictions are unrealistic. The third criterion (called "Maximum of MCR or Max-Min share") does not place any direct restriction on MCRs but it requires long iteration time to converge to the equilibrium point. The fourth criterion (called "Allocation proportional to MCR") can not be used if there are ABR VCs with zero MCRs.

The above leaves only two useful fairness criteria for ABR, namely the second and the fifth. The second criterion (called "MCR plus equal share") requires that each active ABR VC get its contracted MCR plus an equal share of the available elastic bandwidth (the latter is obtained after subtracting the MCRs of all active ABR VCs from the available bandwidth). With the fifth criterion (called "Weighted allocation"), the bandwidth allocation for an ABR VC, say VC vc_no, is proportional to its predetermined weight, w[vc_no]. The weight of a given ABR VC may or may not be related to its MCR.

In addition to the PTI (payload type identifier) field which distinguishes between RM and data cells, and the VCI/VPI (virtual connection identifier/virtual path identifier) fields which identify the connection of a cell, important fields of an RM cell in the context of this invention are the following (see FIG. 2).

DIR (direction) Bit:

When the source creates an RM cell, it sets DIR=0 indicating that this is a forward RM cell. Before the destination loops back an RM cell, it changes DIR to 1 indicating that this is now a backward RM cell. The DIR bit may not be altered by intermediate switches.

CCR (current cell rate) Field:

This is a read-only field that contains the value of ACR at the transmission time of this RM cell.

MCR (minimum cell rate) Field:

This is a read-only field that contains the contracted MCR. MCR is a minimum guaranteed rate. The source's rate need never be less than MCR.

ER (explicit rate) Field:

This is a read/write field. Before the source transmits an RM cell, it should set this field to the desired rate (typically, the peak cell rate of the connection). An intermediate switch along the connection's path may reduce the value of the ER field in RM cells passing through it to whatever value it can support. However, an intermediate switch may never increase the value of the ER field in an RM cell passing through it.

While ATM Forum specification [1] cited above specifies a reference behavior for an ABR end system (e.g. in terms of the generation and handling of RM cells, adjusting ACR, etc.), the ABR switch behavior is largely unspecified and is left as implementation specific. In particular, the method by which a switch monitors its traffic and updates the ER fields of ABR RM cells passing through it is left as implementation specific.

To understand the objectives of an ABR switch mechanism, it is important to first understand the role of ABR within an ATM network (from a network point of view). In general, it is assumed that ABR will have access to the excess bandwidth left unused by "higher" priority traffic classes, namely, VBR and CBR. The handling of CBR bandwidth is really straightforward, since CBR consumes a fixed amount of link bandwidth. However, VBR traffic is bursty by definition which causes the amount of bandwidth available to ABR to fluctuate.

Thus, the function of an ABR switch mechanism is to provide each ABR VC with the "right" rate allocation (inserted in the ER field of ABR RM cells passing through it) with the following two (somewhat conflicting) goals in mind: rapid stabilization to high link utilization and small queue sizes at intermediate switches. Furthermore, the bandwidth available to ABR should be shared in a fair manner among contending ABR VCs. What makes the latter objective non-trivial to achieve is the existence of heterogeneous MCRs and weights (i.e. different ABR VCs may have different MCRs and different weights). For example, assume that two ABR VCs, A and B, share a 100 Mbps link where MCR for VC A is 60 Mbps and MCR for VC B is 0 Mbps. Furthermore, assume that the weight of VC A is 1 while that of VC B is 3. Then a straightforward division of the bandwidth would result in VC A getting 50 Mbps, which is even less than its guaranteed minimum of 60 Mbps. However, the fair share for VC A is 60+(100−60)*(¼)=70 Mbps and the fair share for VC B is 0+(100−60)*(¾)=30 Mbps. This example demonstrates how the only two useful ABR fairness criteria of [1] which are #2 (called "MCR plus equal share") and #5 (called "Weighted allocation") can be combined. In this case, each ABR VC gets its MCR plus a weighted share of the available elastic bandwidth.

It should be noted that this invention intentionally ignores the binary mode of operation for ABR, where switches experiencing congestion set a congestion flag in the headers of data cells and/or set special bits in the RM cells. This is because it is well-known that the explicit rate (ER) mode operation for ABR (where switches know what rates they can support and convey these rates to the ABR sources involved) has far superior performance compared to that of the binary mode [8].

Several mechanisms have been proposed for ABR, including those described in [3], [4], [5], [6] and [7] above. Several of those mechanisms, including [3], [4] and [5] are derivatives of the EPRCA (enhanced proportional rate control algorithm) of [2]. The other well-known mechanism is ERICA (explicit rate indication for congestion avoidance) of [6] and [7]. Before discussing the individual problems associated with the above algorithms, it is useful to first address the problems which they all share.

None of these existing ABR switch mechanisms takes into account the MCR values of the contending ABR VCs in their ER calculations (not to mention any possible VC weights). They all make the assumption that all ABR VCs have the same MCR, and thus there is no need to take MCR into account. Clearly, in a real network, different ABR VCs may have different MCRs (and different weights) and as such any good ABR switch algorithm should take MCR (and VC weight) explicitly into account. Furthermore, while modifying some of the existing algorithms to account for MCR may be possible, this is not necessarily true for all of them. In particular, modifying ERICA [6] to account for MCR does not seem to be an easy task.

In addition to the above problem of not taking MCR into account, existing ABR switch mechanisms also suffer from what is known as the "CCR-reliance" problem. This can be explained as follows. All existing ABR switch mechanisms read the CCR fields of RM cells passing through them and use these fields in the calculations of the ERs. An implicit assumption that the existing mechanisms make is that the CCR field read from an RM cell on a given VC represents the actual rate of the VC at the moment of reading the field. This is not true for the following reasons:

First, CCR represents the maximum rate that the VC can use (i.e. ACR) at the time the RM cell was transmitted by the source. However, it is expected that an ABR VC may not use all of its ACR, and thus ACR will be larger than the actual rate of the VC. Therefore, CCR does not necessarily reflect the actual rate of the VC, even just before the RM cell is transmitted (by the source).

Second, when the RM cell is received by an intermediate switch and its CCR field is read by the switch, the CCR field will be too old to even reflect the current value of ACR back at the source, not to mention its current actual rate.

Third, a bad (but perhaps smart) source may insert the wrong ACR value in its CCR field, hoping to acquire more rate by doing so. If this happens with any of the known ABR switch mechanisms, the network may suffer (in terms of buffer overflows, etc.) and major fairness problems may arise.

To avoid the CCR-reliance problems, per ABR VC rate measurements have to be performed. However, this has been avoided in existing ABR switch mechanisms because it was thought that this (i.e. measuring rates per ABR VC) is too complex to implement and may require scanning of ABR VCs to update their rates.

EPRCA [2] was the first ER switch mechanism to be proposed. In EPRCA, two congestion states are defined: congested when the queue size exceeds some threshold, and very congested when the queue size exceeds a larger threshold. EPRCA maintains a running weighted exponential average, called MACR, of the CCR fields of all ABR VCs (MACR=MACR*15/16+CCR*1/16). This is done by first intercepting any forward RM cell passing through the link under consideration and reading its CCR field. The newly read CCR is allowed to trigger an update to the MACR average only if the link is congested (as defined above) and CCR<MACR, or if the link is not congested (as defined above) and CCR>MACR*⅞. When a backward RM cell is received and the link is very congested, then ER=min(ER in cell, MACR*¼). Otherwise, if the link is just congested and CCR>MACR*⅞, then ER=min(ER in cell, MACR*15/16).

It has been shown by many ATM Forum contributions that EPRCA suffers from the following problems: oscillations, link under-utilization, unfairness, and parameter sensitivity. These problems are in part due to the way EPRCA defines congestion (i.e. queue threshold crossing). The problems are expected to become even worse with the introduction of VBR into the network, since EPRCA takes VBR traffic into account indirectly through the queue length measurements.

ERICA [6] and [7], uses a different approach in coming up with the right ER for each ABR VC, and operates with a target link rate in mind. ERICA uses a count based measurement interval: for every N cells received (it is unclear whether this count includes ABR cells only, or all cells), the following link variables are updated:

Nactive=the number of ABR VCs seen in this interval

VBR_input_Rate=number of VBR cells received/ interval duration

ABR_Capacity=target rate−VBR_Input_Rate

Load_Factor=ABR_Input_Rate/ABR_Capacity

Fair_Share=ABR_Capacity/Nactive

Also, the flag Connection_Seen is reset for all ABR VCs (this requires scanning for all ABR VC at the end of each measurement interval). The CCR fields are read from forward RM cells and stored, and are then used to update the ER fields of backward RM cells according to the following equations.

$$ERS=\max(Fair\_Share, CCR/Load\_Factor)$$

$$ER=\min(ER \text{ in cell}, ERS)$$

Furthermore, multiple backward RM cells on the same ABR VCs which are seen during the same measurement interval are given the same ER value; this is done in order to avoid oscillations. This adds two more variables per ABR VC: a flag to indicate that a backward RM cell has been seen on the VC in this measurement interval, and the rate that was last given to each ABR VC. The flag (together with the above-mentioned Connection_Seen flag) must be reset for all ABR VCs at the end of each measurement interval.

No independent evaluation of ERICA has been published. However, the present inventors have conducted extensive simulation studies of ERICA under various network scenarios and found that ERICA (at least in its published form) suffers from several serious problems. They include:

Scalability

Ignoring VBR traffic for now, ERICA is extremely sensitive to the choice of the measurement interval length. If the recommended 30-cell length (for OC-3 links) is used, that means that a maximum of only 30 ABR VCs can be declared as active in any given measurement interval. This would cause the first term in ERICA's main equation (i.e., Fair_Share=ABR_Capacity/Nactive) to be excessively large, causing problems for the switch since this Fair_Share will be provided to all non idle ABR VCs whether they have contributed to Nactive or not. On the other hand, if the length of the measurement interval is chosen to be large enough (say, 10 times the number of VCs which are set up to pass through the link under consideration), then so much activity may be lost and ERICA would be too slow to react to both congestion and under-utilization problems. If the length of the measurement interval is chosen somewhere in between, severe oscillation would occur. Another aspect of scalability concerns the requirement in ERICA to scan all ABR VCs at the end of each measurement interval in order to reset two per VC flags.

Fairness

It can be shown that, even with MCR=0 (and equal weights) for all ABR VCs, ERICA may not necessarily achieve the max-min fairness criterion in certain network scenarios. For example, it is assumed that the measurement interval length is chosen in such a way that the above-mentioned problems are avoided (it is not certain that this is possible). It is further assumed that a large number of ABR VCs exist on a link where all of them (except, say, for one VC) are rate limited. In this case, the ACRs of the rate limited VCs will be determined through the first term in ERICA's main equation (i.e. Fair_Share=ABR_Capacity/ Nactive). On the other hand, the ACR of the only greedy VC will be determined through the second term in ERICA's main equation (i.e. CCR/Load_Factor). Now, if one of the initially rate limited VCs decides that it wants to become greedy and uses all of the bandwidth that it is given, it may not be able to share the link fairly with the VC that initially started as greedy. This happens because the network locks into the wrong set of rate allocations.

OBJECTS OF THE INVENTION

It is therefore an object of the invention to provide a method of controlling the flow of ABR traffic in an ATM network.

It is also an object of the invention to provide a method of controlling the flow of ABR traffic in an ATM network by ER value for each VC.

It is another object of the invention to provide a method of calculating an ER value for each VC.

It is a further object of the invention to provide a method of calculating an ER value which realizes a high link utilization.

It is still a further object of the invention to provide a method of calculating an ER value which realizes a small queue size requirement at an ATM switch.

It is yet another object of the invention to provide a method of calculating an ER value which realizes a fair share of bandwidth among virtual connections.

It is yet a further object of the invention to provide a method of controlling the flow of ABR traffic in an ATM network in which each switch regulates independently of other switches, the amount of ABR traffic it receives with the following objectives in mind: achieving a given target link utilization quickly, keeping the queue sizes small, and achieving fairness among ABR VCs.

SUMMARY OF THE INVENTION

Briefly stated, the invention resides in an ATM network including one or more ATM switches. In one aspect, the invention is directed to a method of controlling the ABR traffic flow on a given link of an ATM switch. The method comprises steps which are performed during a measurement interval of a preset length of time. They are steps of obtaining input and output rates of the ABR traffic flow as well as input and output rates of other service classes and obtaining a rate available to ABR traffic. There are further steps of generating a load factor, LF, which relates to the rate available to ABR traffic, where an input rate refers to the rate of cell arrival and an output rate to the rate of cell departure on the link under consideration, and adjusting the ABR traffic flow in response to the load factor.

According to another aspect, the invention resides in an ATM network carrying ABR traffic including ABR resource management cells called RM cells which carry ER, explicit rate, and CCR, current cell rate, fields. In this aspect, the invention is directed to a method of controlling the ABR traffic flow by means of the RM cells. The method comprises steps of receiving and processing forward RM cells and receiving and processing backward RM cells. The method further includes steps of generating an explicit rate allocation to be placed in the ER field in a backward RM cell and sending the backward RM cell containing the allocated rate in the ER field.

In accordance with yet another aspect, the invention is directed to a method of controlling the ABR traffic flow by means of RM cells in which the step of receiving and processing a forward RM cell includes the steps of determining the actual input rate of the VC, Actual_Rate, on which the forward RM cell has been received, and updating rate and weight averages to be used when allocating rates to the ABR VCs.

BRIEF DESCRIPTION OF THE DRAWINGS

FIG. 1 shows an ABR RM cell format;

FIG. 2 shows characteristics of a few fields of an ABR RM cell which are relevant to the invention;

DETAILED DESCRIPTION OF THE PREFERRED EMBODIMENTS OF THE INVENTION

1. Introduction

On a given ABR VC, the source sends data cells to the destination through one or more intermediate ATM switches. Furthermore, in accordance with the ATM Traffic Management Specification [1] referred to above, the source periodically creates and sends forward RM cells. The aggregate traffic sent by the source is dynamically shaped to ACR (allowed cell rate), which is controlled by the network. The forward RM cells travel through the same path as that of the data cells on the same VC. These forward RM cells are characterized by having their DIR bit set to 0 (see FIG. 2) and carry information about the source that can be useful to the network. In particular, the source inserts its current ACR in the CCR (current cell rate) field of the forward RM cell. Also, it inserts its contracted MCR (minimum cell rate) in the MCR field. Furthermore, it indicates its desired rate through the ER (explicit rate) field; typically, the ER field will be initially set to PCR (peak cell rate) of the connection.

When the destination receives a forward RM cell, it changes the DIR bit to 1 indicating that the cell is now a backward RM cell, reduces the ER field to whatever value it can support, and finally loops the RM cell back to the source. The backward RM cells travel through the same path as that of the data and forward RM cells on the same VC, but in the reverse direction.

In accordance with the ATM Forum Traffic Management Specification [1], intermediate switches have the option of intercepting forward and/or backward RM cells to reduce their ER fields to whatever values they can support as long as fairness is maintained. Thus, when an RM cell finally returns to its originating source, its ER field would reflect the maximum possible rate on the most congested link along the connection's path. The source then adjusts its ACR using:

$$ACRnew = \min(ER \text{ in returning } RM \text{ cell}, ACRcurrent + RIF \ast PCR)$$

where RIF (rate increase factor) is a parameter that is determined during connection set-up. The source always ensures that the resulting ACR is never below MCR or above PCR. It can be seen that when RIF=1, ACR is totally controlled by the ER values in returning RM cells.

Figure 3:
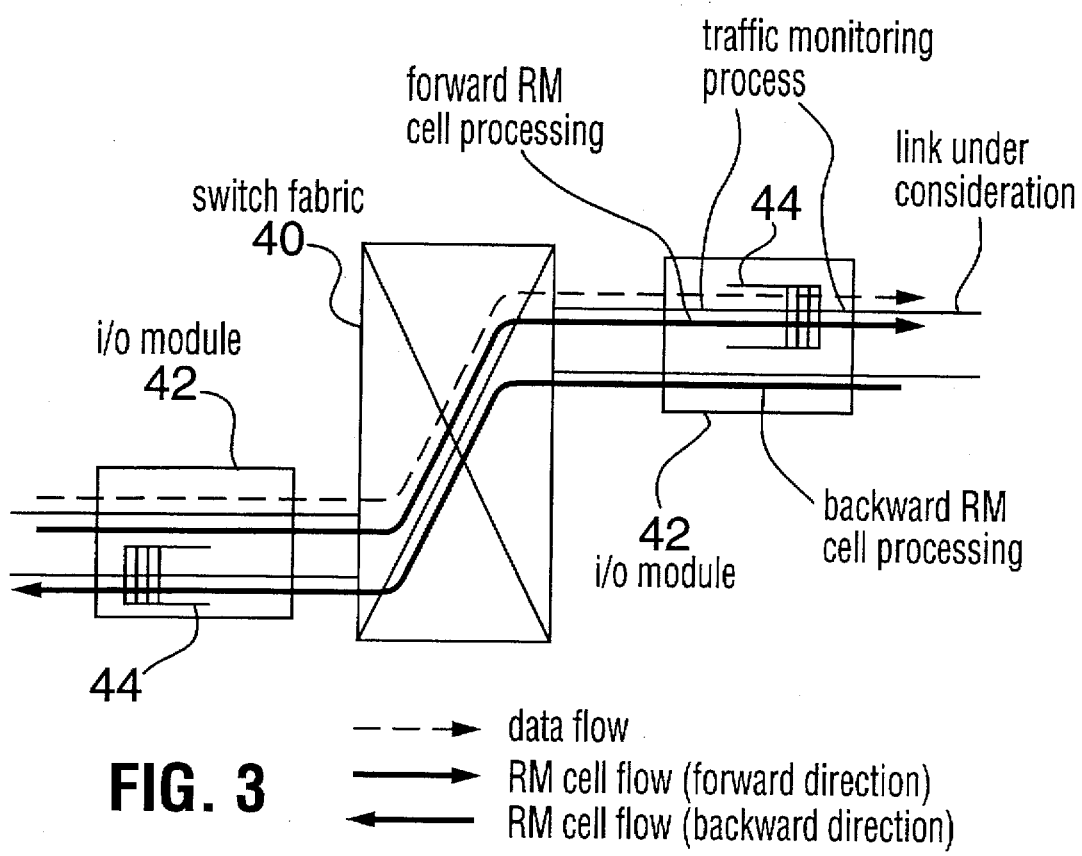
FIG. 3 is a schematic illustration of an embodiment of the invention applied to an output buffered ATM switch.

FIG. 3 is a schematic diagram of one embodiment as applied to a single output-buffered ATM switch. In the figure, a switch fabric 40 connects a pair of ports 42, each having a queue 44 at its egress. The data cell flow and RM cell flows associated with one direction of an ABR VC are shown in differing solid lines with an arrow. This diagram will be useful in understanding the current invention, particularly where each process of the invention takes place. However, it should be noted that the invention itself applies to any ATM switch architecture and is not restricted to output-buffered switches only. The invention typically resides at each queuing point of an ATM switch.

The invention comprises four processes, namely, a traffic monitoring process, a measurement interval process, a forward RM cell process, and a backward RM cell process. Before describing the details of these processes, it is useful to first list and describe the various parameters and variables the processes use.

2. Parameters and Variables

These can be classified into three categories, namely, (1) per-link parameters which are set by the operator and used by the various processes of the invention; (2) per-ABR-VC parameters which are set by the operator and used by the various processes of the invention; (3) per-link variables which are used and/or altered by the various processes of the invention; and (4) variables which are stored on a per-ABR-VC basis and are used and/or altered by the various processes of the invention. The following four tables describe the various parameters and variables according to the above classification.

| Per-Link Parameters: | |
|---|---|
| T | :length of measurement interval in seconds |
| TCR | :target cell rate (=target utilization*link bandwidth) |
| Alpha$_1$ | :weight used in updating the link's mean elastic rate (MER) |
| Alpha$_2$ | :weight used in updating Running_Rate_Average[vc_no] |
| Alpha$_3$ | :weight used in updating AVW |
| LF_Threshold | :load factor threshold below which the link is considered to be excessively over loaded |
| MOF | :maximum overbooking factor for the whole link; determines how much total rate may be given away (to all ABR VCs) compared to the actual output rate available to ABR |
| MCR_Switch | :may be used to avoid setting ER to zero for VCs with MCR=0 |

Some suggested values for the above parameters are as follows: T=0.5–1 ms for OC-3 and 0.125–0.5 ms for OC-12. Target link utilization of 90%–95%. Alpha$_1$ and Alpha$_3$ of 1/16 each, and Alpha$_2$ of 1/4. LF_Threshold of 0.9. MOF of 1.5–2. MCR_Switch of 10–20 cells per second. To disable LF_Threshold associated behavior, set UF_Threshold=0. To disable MOF associated behavior, set MOF to a very large value. To disable MCR_Switch associated behavior, set MCR_Switch=0.

Per-ABR-VC Parameters:

| | |
|---|---|
| MCR[vc_no] | :contracted MCR of this VC; remains fixed during the lifetime of the connection; if the ABR sources can be trusted, the MCR fields carried by RM cells may be read and used instead. |
| w[vc_no] | :VC weight used in fairness definition |

Suggested default for w[vc_no] is 1.0.

Per-Link Variables:

| | |
|---|---|
| MER | :mean elastic rate; the running exponential weighted average of all CCRs seen without their MCR components; updated with every forward RM cell arrival; weight used is $Alpha_1$ |
| LF | :load factor; the ratio of the rate available to ABR to the maximum of the aggregate ABR input rate and aggregate ABR output rate |
| Rate_Available_To_ABR | :amount of link bandwidth available to ABR traffic as of the most recent measurement interval |
| AVW | :average weight; running exponential weighted average of the weights of all seen ABR VCs; weight used is $Alpha_3$ |
| Sum_Of_ERs_Given | :running sum of the latest explicit rates given on all ABR VCs |
| ABR_In_Count | :number of ABR cells received since the end of the last measurement interval (incremented with every ABR cell arriving at the queue) |
| VBR_In_Count | :number of VBR cells received since the end of the last measurement interval (incremented with every VBR cell arriving at the queue) |
| CBR_In_Count | :number of CBR cells received since the end of the last measurement interval (incremented with every CBR cell arriving at the queue) |
| UBR_In_Count | :number of UBR cells received since the end of the last measurement interval (incremented with every UBR cell arriving at the queue) |
| ABR_Out_Count | :number of ABR cells sent since the end of the last measurement interval (incremented with every dequeued ABR cell) |
| VBR_Out_Count | :number of VBR cells sent since the end of the last measurement interval (incremented with every dequeued VBR cell) |
| CBR_Out_Count | :number of CBR cells sent since the end of the last measurement interval (incremented with every dequeued CBR cell) |
| UBR_Out_Count | :number of UBR cells sent since the end of the last measurement interval (incremented with every dequeued UBR cell) |

Per-ABR-VC Variables:

| | |
|---|---|
| Running_Rate_Average[vc_no] | :running exponential weighted average of all CCRs seen on this VC; weight used is $Alpha_2$ |
| Last_ER_Given[vc_no] | :last explicit rate given to this VC |

3. Traffic Monitoring Process

The traffic monitoring process is concerned with monitoring the traffic arriving at the queue and leaving it, and updating various cell counts. These counts are used by the measurement interval process to determine the link's load factor as well as the output rate available to ABR traffic. The following code illustrates several possible counts.

```
when a cell arrives at the queue:
    if (ABR cell) ABR_In_Count=ABR_In_Count+1
    if (VBR cell) VBR_In_Count=VBR_In_Count+1
    if (CBR cell) CBR_In_Count=CBR_In_Count+1
    if (UBR cell) UBR_In_Count=UBR_In_Count+1
when a cell leaves the queue:
    if (ABR cell) ABR_Out_Count=ABR_Out_Count+1
    if (VBR cell) VBR_Out_Count=VBR_Out_Count+1
    if (CBR cell) CBR_Out_Count=CBR_Out_Count+1
    if (UBR cell) UBR_Out_Count=UBR_Out_Count+1
```

In the above table, cell counts for traffic categories other than ABR are included as examples. Depending on the queuing structure and service discipline, more or less information may be needed. The above cell counts are reset to zero at the end of each measurement interval.

4. Measurement Interval Process

In the embodiments described herein, time-based measurement interval is used, where the length of each measurement interval is T seconds. This approach is preferred to the count based approach [6]. However, if a count-based approach is used, it should be coupled with a time-out mechanism. At the end of each measurement interval, the cell counts of the traffic monitoring process are utilized, together with the target cell rate, TCR, and the knowledge of the queuing structure and service discipline to determine the rate available to ABR and the link's load factor, as illustrated in the following code. Again, it should be emphasized that not all of the above non-ABR counts (and associated rates) may be needed, depending on the particular details of the queuing system and network involved.

```
Every T Seconds:
    ABR_In_Rate = ABR_In_Count/T
    VBR_In_Rate = VBR_In_Count/T
    CBR_In_Rate = CBR_In_Count/T
    UBR_In_Rate = UBR_In_Count/T
    ABR_Out_Rate = ABR_Out_Count/T
    VBR_Out_Rate = VBR_Out_Count/T
    CBR_Out_Rate = CBR_Out_Count/T
    UBR_Out_Rate = UBR_Out_Count/T
    Rate_Available_To_AB R = function of (TCR, VBR_In_Rate,
            CBR_In_Rate
            UBR In_Rate, VBR_Out_Rate, CBR_Out_Rate,
            UBR_Out_Rate, reserved bandwidth
            for the various traffic
            categories, queuing structure and service discipline,
            previous samples of Rate_Available_To_ABR)
    LF = Rate_Available_To_ABR/max(ABR_In_Rate,
            ABR_Out_Rate)
    ABR_In_Count = 0
    VBR_In_Count = 0
    CBR_In_Count = 0
    UBR_In_Count = 0
    ABR_Out_Count = 0
    VBR_Out_Count = 0
    CBR_Out_Count = 0
    UBR_Out_Count = 0
```

Unlike existing ABR switch mechanisms, in determining the load factor LF, both the ABR input rate and the ABR output rate are used. In particular, the ABR output rate handles, in a very simple and effective manner, situations where ABR cells accumulate in the queue, say, because of VBR traffic. This is preferred to using the ABR input rate alone in determining the load factor, since this could result in queue build-up when the link is shared with higher priority traffic. This latter phenomenon can be explained as follows. When there is a surge of VBR traffic, the rate available to ABR will be reduced forcing the reduction of ABR rates. However, until the switch detects the reduction of ABR rates, it may have to store a significant number of ABR cells. When the VBR traffic disappears, all the links' output rate becomes available to ABR, and ABR rates are restored to their original values despite the fact that there is a large number of ABR cells already queued. As the VBR traffic arrives and leaves quickly, ABR cells keep accumulating in the queue. The above problem is handled through this approach of using both the ABR input rate and the ABR output rate in determining the load factor. (As an alternative, the queue size may be used to adjust the rate available to ABR.)

Similarly, it makes sense to take into account not only the VBR input rate but also the VBR output rate in determining the rate available to ABR. Interestingly, the only algorithm (which is ERICA) that takes VBR traffic into account uses only the ABR input rate and the VBR input rate in determining both a load factor and how much rate is available to ABR traffic [7].

5. Forward RM Cell Process

This process is invoked when a forward RM cell arrives at the queue. The following code illustrates the steps involved in this process.

```
Get the CCR field-->Cell_CCR
Send the cell
Running_Rate_Average[vc_no] =
    Running_Rate_Average[vc_no]+Alpha_2*
    (Cell_CCR-Running_Rate_Average[vc_no])
MER = MER+Alpha_1*(Cell_CCR-MCR[vc_no]-MER)
AVW = AVW+Alpha_3*(w[vc_no]-AVW)
    (Notice that Cell_CCR is a local variable.)
```

It can be seen from the above code that this is a relatively simple process in term of the steps involved. In the first step, the CCR field of an arriving forward RM cell is read. After reading the CCR field, there is no need to retain the cell; it may be immediately released to the queue.

The second step uses the read CCR value to update a moving average of the CCRs seen on this VC, which is called Running Rate_Average[vc_no]. This is unlike existing ABR switch mechanisms which use only the last CCR seen on a VC. It had been shown that this (i.e. using just the last CCR seen on a VC) could result in oscillation problems. This averaging approach eliminates these problems without having to resort to solutions that require, e.g., scanning all ABR VCs at the end of each measurement interval [6].

In the third step, the MCR of the connection is subtracted from the read CCR, and the resultant value is used to update the link's mean elastic rate, MER. This is called elastic since CCR actually consists of two components: a static or guaranteed component which is MCR, in addition to an elastic part that is controlled by the network. Thus, MER estimates the average of the elastic parts of CCRs of "active" ABR VCs, without having to try to define "active" and detect/count "active" ABR VCs.

Finally, a moving average of the ABR VC weights, called AVW, is maintained; it will be used when allocating rates for ABR VCs.

While the above code uses simple first order filters for three moving averages maintained, it may be worthwhile to try to optimize these filters and/or use higher order filters.

6. Backward RM Cell Process

This process is invoked when a backward RM cell arrives from the network on the ingress link (see FIG. 3). This process is concerned with the rate allocation problem (i.e.

how much rate each ABR VC should get). Intercepted backward RM cells may have their ERs reduced by this process in order to meet the link's target cell rate while maintaining fairness among ABR VCs. The following code illustrates the steps involved in the backward RM cell process.

```
if (LF<LF_Threshold):
    ERS = MCR[vc_no]+MER*(w[vc_no]/AVW)*LF
else
    ERS = max(MCR[vc_no]+MER*(w[vc_no]/AVW)*LF,
        Running_Rate_Average[vc_no]*LF
ERS = max(ERS, MCR_Switch)
ERS = min(ERS, ER in cell)
ERS = max(ERS, MCR[vc_no])
Sum_Of_ERs_Given=
Sum_Of_ERs_Given-Last_ER_Given[vc_no]+ERS
Last_ER_Given[vc_no]=ERS
AOF=Sum_Of_ERs_Given/Rate_Available_To_ABR
if (AOF>MOF):
    ERS=ERS/(AOF/MOF)
    ERS=max(ERS, MCR[vc_no])
    Sum_Of_ERs_Given=
    Sum_of_ERs_Given-Last_ER_Given[vc_no]+ERS
    Last_ER_Given[vc_no]=ERS
Replace the ER field with ERS and send the cell
    (Notice that both ERS and AOF are temporary variables.)
```

This process differentiates between two link states. When the load factor, LF, is greater than a certain threshold, LF_Threshold, the link is considered to be within normal operating conditions. This, however, does not mean that such a link may not be overloaded. In fact, if LF_Threshold<LF<1.0, the link is overloaded, but slightly. However, as long as LF>LF_Threshold, the same equation is used in determining an initial estimate of ER:

```
ERS=max(MCR[vc_no]+MER*(w[vc_no]/AVW)*LF,
    Running_Rate_Average[vc_no]*LF).
```

The first term in the above equation implements the ATM Forum Traffic Management second and fifth notions of fairness [1]; this means that an ABR VC gets its MCR+ weighted share of the available elastic bandwidth (the latter is obtained after removing the MCRs of "active" ABR VCs from the available bandwidth.)

The weigthed share is obatained through the term MER* (w[vc_no]/AVW). This is because MER estimates:

(sum of elastic rates of active ABR VCs/number of active ABR VCs)

and AVW estimates:

(sum of weights of active ABR VCs/number of active ABR VCs).

Thus, MER*(w[vc_no]/AVW) results in:

(sum of elastic rates of active ABR VCs*w[vc_no]/sum of weights of active ABR VCs)

which is exactly what is needed in order to estimate the weighted share of the elastic bandwidth for a given ABR VC. Note that the above is achieved without having to define what "active" means and/or count active ABR VCs. The above quantity is then scaled up or down by the load factor, LF, to account for situations where the elastic rate available to ABR fluctuates, say because of VBR traffic.

In case some ABR VCs do not use all of their allocated rate (e.g. because they are themselves rate-limited or they are bottlenecked somewhere else), the second term of the above equation kicks in quickly, bringing the link's utilization to the target level. It can be seen that this second term (i.e. Running_Rate_Average[vc_no]*LF) is very VC specific.

The above equation may suffice in most operating regions, but not all. If this equation is always used, there will be certain network scenarios where some ABR VCs may hog the bandwidth because they were there first, making it very difficult for new ABR VCs to acquire their fair share of the bandwidth. This happens when the network locks into the "wrong" set of rate allocations. Therefore, it is necessary to define a state where the link is excessively overloaded (e.g. because a new ABR VC has just started up) and to treat this state differently.

When LF<LF_Threshold, the link is considered to be excessively overloaded. In this case, the main equation used no longer contains the second term which is very VC specific. It consists only of one term, MCR[vc__no]+MER (w[vc__no]/AVW)*LF, which ensures that newly active ABR VCs are able to acquire, in addition to their MCRs, their fair share of the elastic bandwidth (which is the bandwidth available to ABR minus the MCRs of "active" ABR VCs).

After calculating an initial ER value as discussed above, one may want to ensure, regardless of the link's condition, that the rate given to an ABR VC keeps it alive. This can be achieved through the parameter MCR_Switch. While MCR_Switch is expected to be very small, it will be useful in avoiding completely shutting down an ABR VC that has MCR=0.

Furthermore, in accordance with the ATM Forum Traffic Management Specification [1], a switch may never increase the ER carried by an RM cell, therefore ERS=min(ERS, ER in cell). However, a situation where another switch or destination incorrectly inserts an ER value that is less than the MCR of that VC, must be fixed. In this case, $$ERS = \max(ERS, MCR[vc\_no]).$$

It is important to keep in mind that the approach taken in solving the rate allocation problem for ABR VCs is spread over time. That is, each VC is dealt with separately and when its RM cells show up. Thus, there is no coordination among the various ABR VCs. As a result, the total rate given away to all ABR VCs (which is called Sum_Of_ERs_Given) may exceed the actual rate available to ABR. If this constitutes a problem for the switch, the rate that has just been calculated may be further reduced, depending on the Sum_Of_ERs_Given, the actual rate currently available to ABR, and possibly a maximum overbooking factor, MOF.

7. Per-ABR-VC Rate Measurements

As has been discussed earlier, all existing ABR ER switch mechanisms suffer (among other problems) from the CCR-reliance problem. While the method described so far solves many problems of existing ABR switch mechanisms (e.g., fairness, scalability, etc.), it nevertheless suffers from the same CCR-reliance problem. This problem arises, e.g., when a bad user lies about his CCR. While this may not constitute a serious problem for private networks, the situation is totally different when public networks are involved. In a public network, a bad user should never be allowed to affect the service being provided to other users.

To solve the CCR-reliance problem, the actual rates have to be measured per ABR VC. One (straightforward) approach to achieve that would be to update the rate measurements of ABR VCs at the end of each measurement interval, similar to the approach used in updating the aggregate traffic rate measurements. However, this approach is too complex to implement since it requires scanning of all ABR VCs at the end of each measurement interval. Thus, it does not scale well with the number of ABR VCs.

It has therefore been decided to choose an event-driven approach where the rate measurement update for an ABR VC is triggered by the arrival of its own RM cells. According to one embodiment, this event-driven approach requires a few modifications to some processes of the invention described earlier.

In the traffic monitoring process, when an ABR cell arrives at the queue on a given VC, a cell count on that VC, Nfwd [vc__no] is also incremented.

```
when a cell arrives at the queue:
    if (ABR cell)
        ABR_In_Count = ABR_In_Count+1
        Nfwd[vc__no] = Nfwd[vc__no]+1
```

Nfwd[vc__no] represents the number of cells received on this ABR connection since the last forward RM cell was received.

Letting Tfwd [vc__no] be the time at which the last forward RM cell was received, the forward RM cell process is modified as follows:

```
Actual_Rate = Nfwd[vc__no]/(current time - Tfwd[vc__no])
Nfwd[vc__no] = 0
Tfwd[vc__no] = current time
Running_Rate_Average[vc__no] =
    Running_Rate Average[vc__no]+
    Alpha₂*(Actual_Rate-Running_Rate_Average[vc__no])
MER = MER+Alpha₁*(Actual_Rate-MCR[vc__no]-MER)
AVW = AVW+Alpha₃*(w[vc__no]-AVW)
    (Notice that Actual_Rate is a temporary variable.)
```

Notice that the forward RM cell arrival triggers the above calculations, and, depending on the particular implementation, one may or may not need to actually intercept the forward RM cell and read its CCR field. However, reading the CCR field of each forward RM cell is recommended since the comparison between a received CCR and the previous actual measured rate can reveal valuable information about the activity of the VC, e.g., whether it is "lazy" or "greedy", whether it is using all or most of its allowed rate or not, etc. Such information may be then used by the backward RM cell process to more efficiently allocate the rates and more tightly protect the switch.

In summary, the method of the invention typically resides in each queuing point of the switch, and it comprises four processes, namely, a traffic monitoring process, a measurement interval process, a forward RM cell process, and backward RM cell process.

The traffic monitoring process is concerned with monitoring the traffic (ABR and otherwise) being received and dequeued, and updating various cell counts. These cell counts are used by other processes.

In the measurement interval process, the output rate available to ABR is determined and a load factor is updated. This involves steps to determine the ABR input rate, the ABR output rate, and the input and/or output rates of other traffic classes. One novel feature of the invention is that it takes into account not only ABR input rate, but also ABR output rate. This indirectly takes into consideration the ABR cells already in the queue, especially in situations where ABR cells accumulate in the queue because of, e.g., VBR traffic. Another novel feature of the invention is that, when determining the rate available to ABR, it takes into account both the input and output rates of VBR as well as previous samples of the rate available to ABR.

In the forward RM cell process, forward RM cells are intercepted and their CCR fields are read. The read CCRs are used to update certain link and VC variables. In particular, a moving average of the CCRs seen on each VC is maintained. Furthermore, a moving average of the CCRs seen on all VCs (but without their MCR components) is also maintained; this link variable is called the mean elastic rate. Also, a moving average of the weights of all seen ABR VCs is maintained. Thus, one novel feature of the invention is the averaging of the CCRs seen on a VC. By doing so, certain oscillation problems are avoided without resorting to approaches which require scanning of all ABR VCs at the end of each measurement interval. Another novel feature of the invention is the subtraction of MCR from CCR before triggering an update to the link-wide average of CCRs (i.e. the mean elastic rate). This achieves an MCR-based fairness. A third novel feature is the averaging of the weights of seen ABR VCs.

In the backward RM cell process, backward RM cells are intercepted to update their ER fields. One novel feature of the invention is its main equation of calculating the ER for a VC. That equation utilizes the VC's MCR, the VC's weight, the moving average of CCRs seen on this VC, the link's mean elastic rate, and the link's load factor. Another novel feature of the invention is the differentiation between two link states when calculating the ER for a given VC: excessively overloaded (when the load factor is less than some threshold), and otherwise. This differentiation is found to be extremely important to prevent the network from being locked into the wrong set of rate allocations and to allow newly active ABR VCs to acquire their fair share of the bandwidth. Through yet another novel feature of the invention, the rate allocation may be further adjusted based on how much total rate (on all ABR VCs) is allowed as compared to the output rate actually available to ABR; this is controlled through a maximum overbooking factor. Yet another novel feature of the invention is that it employs a widely-accepted MCR-weight-based fairness criterion.

In one preferred variation of the above, rates are measured per ABR VC. This is done in a novel simple event-driven approach where the rate measurement updates on a given ABR VC are triggered with the arrival of its own RM cells. Now that the rates are measured per ABR VC, it is possible to know exactly the actual rate of each ABR VC and also to distinguish between "lazy" ABR VCs and non-lazy ones. The above can be utilized in the ER calculations in a variety of ways.

8. Simulation Results

Here, some simulation results are presented. The purpose of this section is not to provide a full analysis of the invention, but rather to demonstrate the importance of one of its key features, namely, per-ABR-VC rate measurements.

Figure 4:
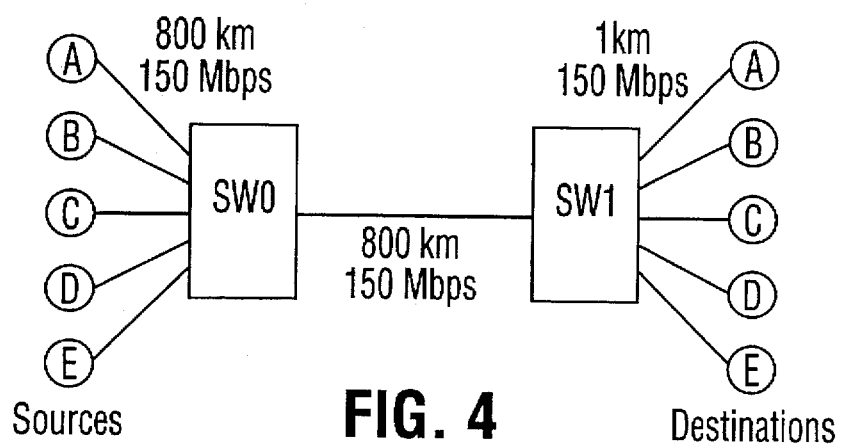
FIG. 4 is a schematic illustration of a simulation set-up.

FIG. 4 shows the simulated network scenario which consists of two switches, SW0 and SW, interconnected through a 150 Mbps link of 800 km in length. Five source end systems, A, B, C, D and E, are connected to SW0, each by a 150 Mbps link of 800 km in length. Five destination end systems, A, B, C, D, and E, corresponding to the above five sources, are connected to SW1, each by a 150 Mbps link of 1 km in length. Each source-destination pair has only one ABR VC. It can be seen that the five VCs share the only inter-switch link. The propagation delay is assumed to be $5*10-6$ sec/km and therefore the maximum round trip propagation time is 0.016 seconds. Output-buffered switches are used and infinite buffer sizes are assumed.

Unless otherwise specified, the following settings for the algorithm described above are used: target link utilization of 0.95, T=1 ms, $Alpha_1=Alpha_3=1/16$, $Alpha_2=1/4$, LF_Threshold=0.90, MOF=100 (i.e. not used), and MCR_Switch=0 (i.e. not used). For the ABR sources, the following parameters are used: RIF=1.0 (i.e. pure ER mode), ICR (initial cell rate)=10 Mbps, MCR=0.15 Mbps, and PCR=150 Mbps. Furthermore, no use-or-lose-it or RM-cell time-out mechanisms are used at the sources.

Figure 5A:
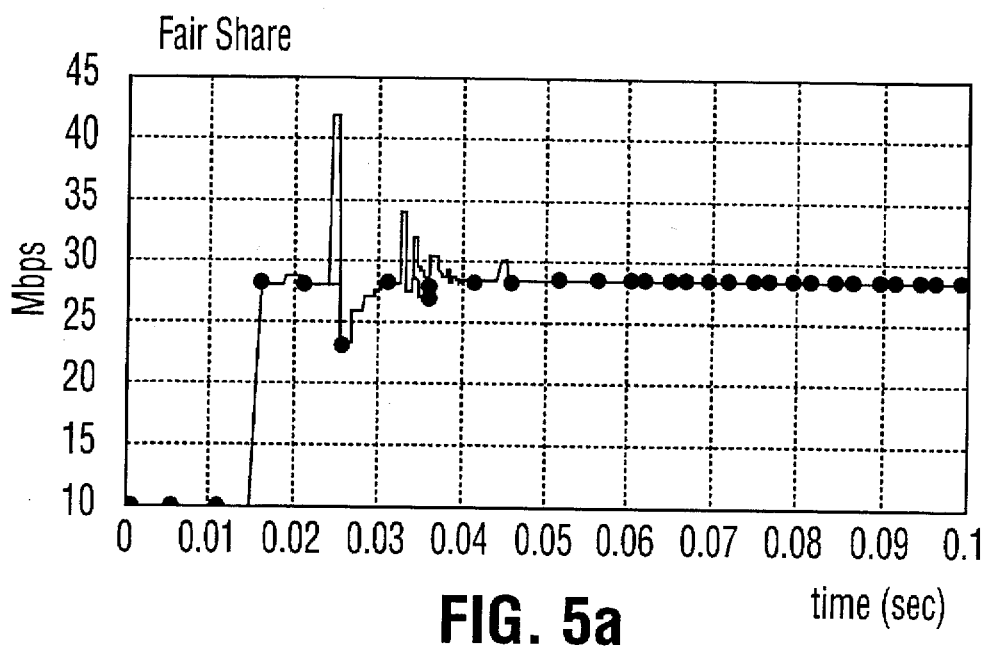
FIGS. 5a, 5b and 5c are results of a simulation.
Figure 5B:
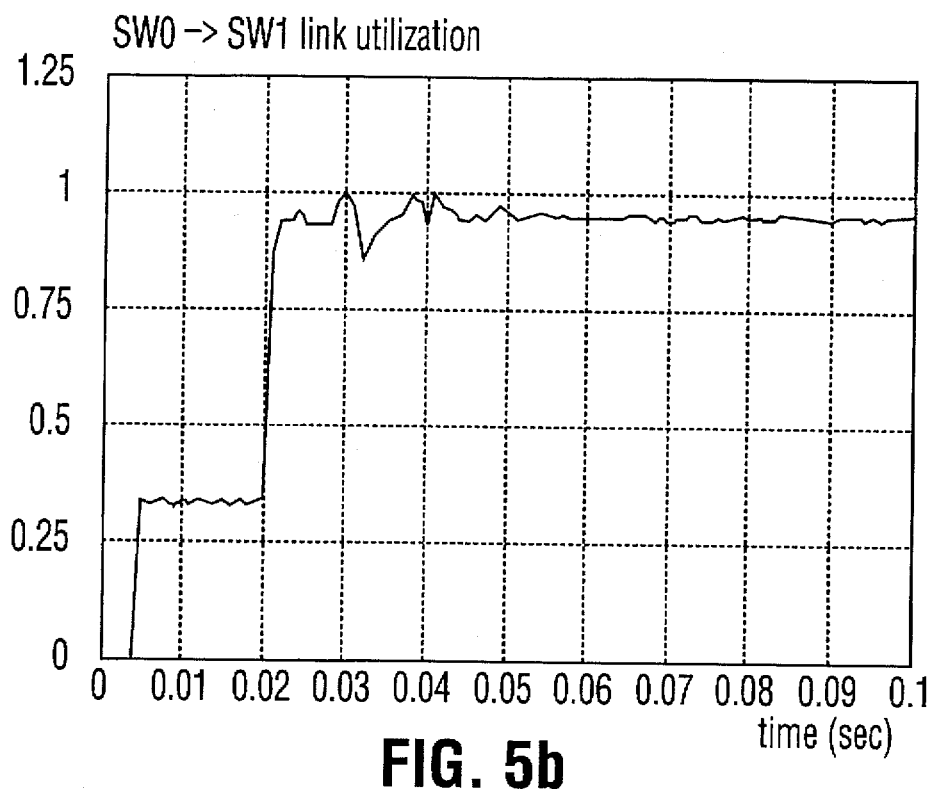
Figure 5C:
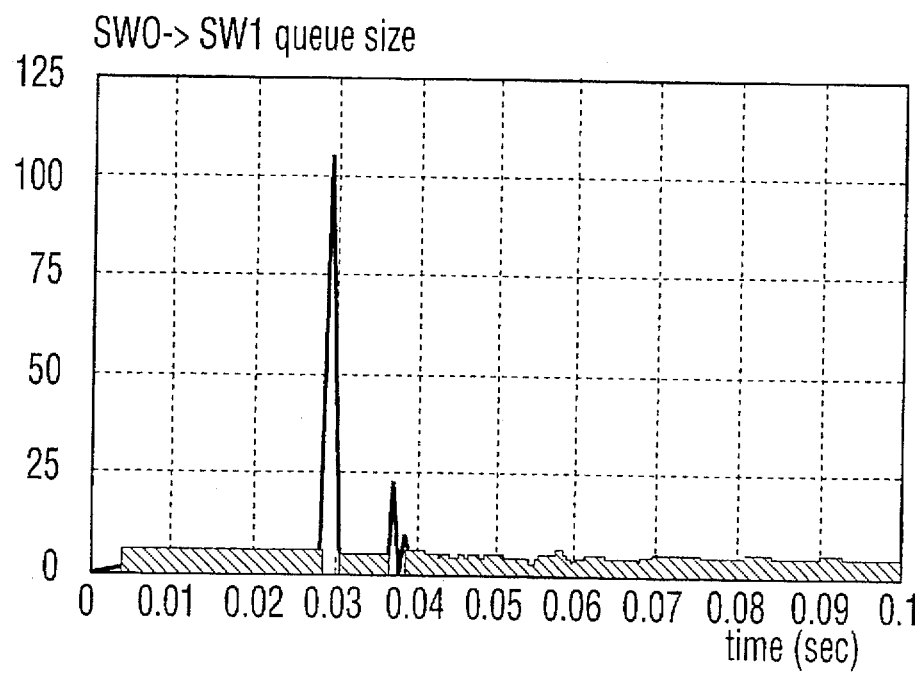

FIGS. 5a, 5b, 5c, 6a, 6b, 6c, 7a, 7b, 7c, 8a, 8b, and 8c show some simulation results. For the results shown in FIGS. 5a-5c and 6a-6c, no per-ABR-VC rate measurements are performed. In other words, the calculation of ER is done by using the CCR fields instead of the actual measured rates. In FIGS. 5a-5c, all five ABR VCs are assumed to be persistent. A persistent source is a one that uses all of its allowed cell rate or ACR; thus it always has something to send. FIGS. 5a-5c contain graphs indicating changes of ACR, SW0->SW1 link utilization, and SW0->SW1 queue length, all with respect to time. It can be seen in FIG. 5a that all five sources whose measurements are collectively shown by squares converged to their fair share of 0.95*150 Mbps/5=28.5 Mbps each. The link reached its 0.95 target utilization in a very short time. The peak queue size is small.

Figure 6A:
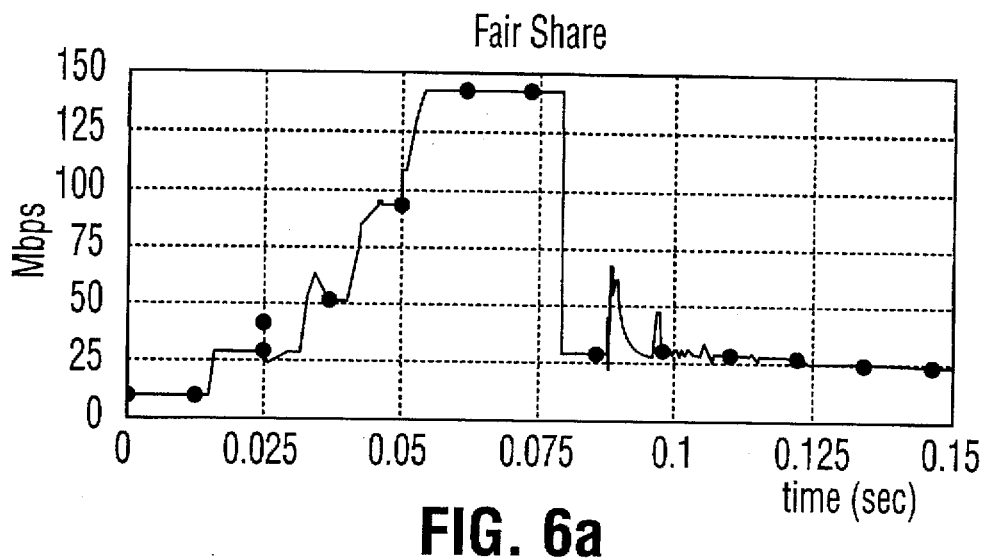
FIGS. 6a, 6b and 6c are results of another simulation.
Figure 6B:
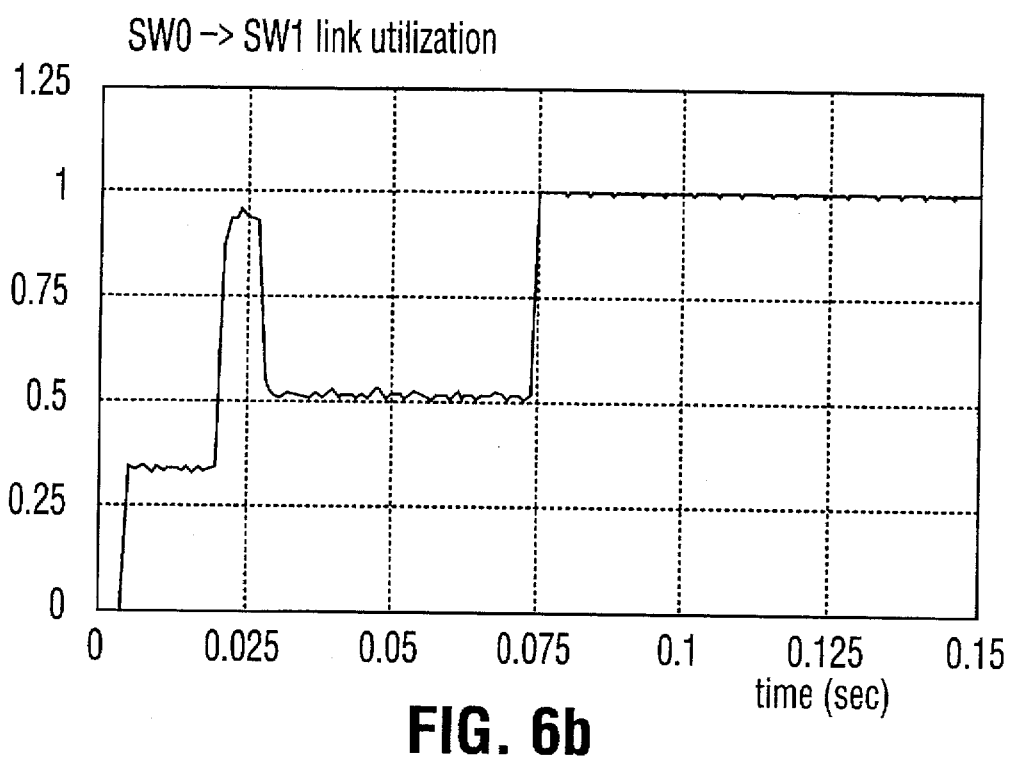
Figure 6C:
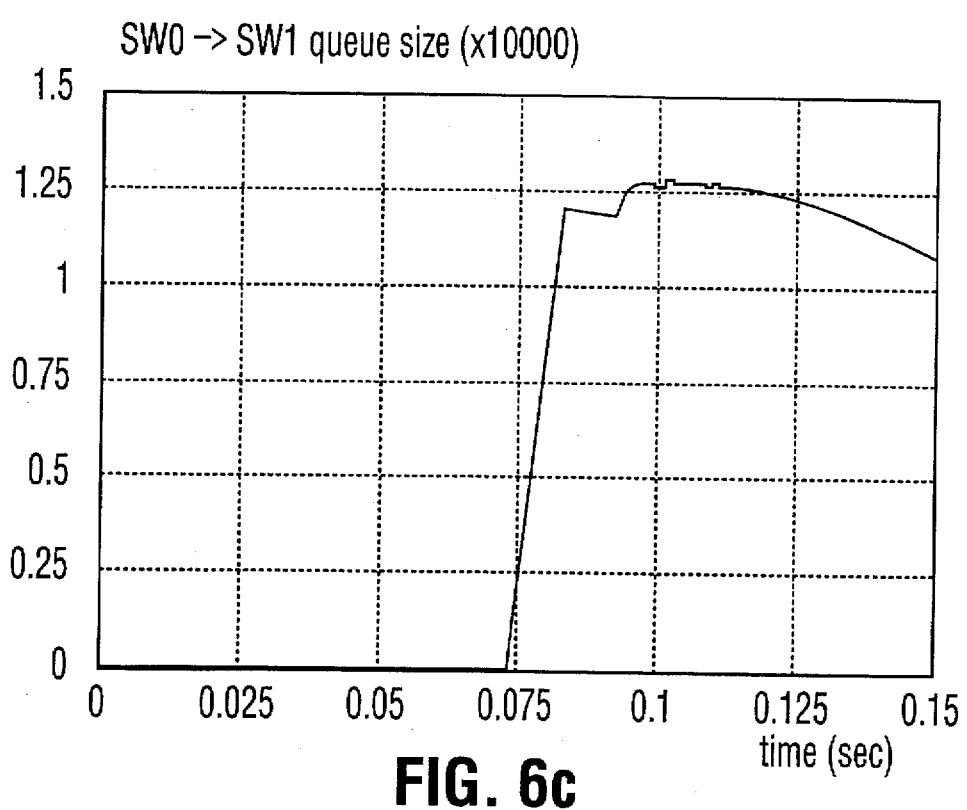

In FIGS. 6a-6c, all sources start rate-limited to 15 Mbps until time t=0.07 seconds when they become persistent. A rate-limited source is one that can send at a rate not exceeding a certain limit, even if it is given a high ACR. Thus, before time t=0.07 seconds, the link utilization is expected to be 15 Mbps*5/150 Mbps=0.50; after time t=0.07 seconds, the link should reach its target utilization of 0.95.

As seen from FIGS. 6a-6c, even with five VCs, switch SW0 was exposed to more than 12,500 cells when all five VCs decided to go persistent at the same time. The problem arises simply because the switch feels that it is underloaded and increases the rate allocation of all VCs. When nothing happens and RM cells arrive at the switch with the new (higher) CCRs, the rates are increased one more time, and so on, until each VC gets the full target cell rate (which is 0.95*150 Mbps=142.5 Mbps). When all five VCs suddenly become active at the same time and use their full ACRs, switch SW0 suffers. The problem gets worse as the number of VCs increases.

It is important to point out here that the above problem has not been caused by "bad" sources since all sources used were good and compliant. Rather, the problem was caused by relying on the CCR fields as indications of the sources' actual rates, something that all existing ABR switch mechanisms do.

Figure 7A:
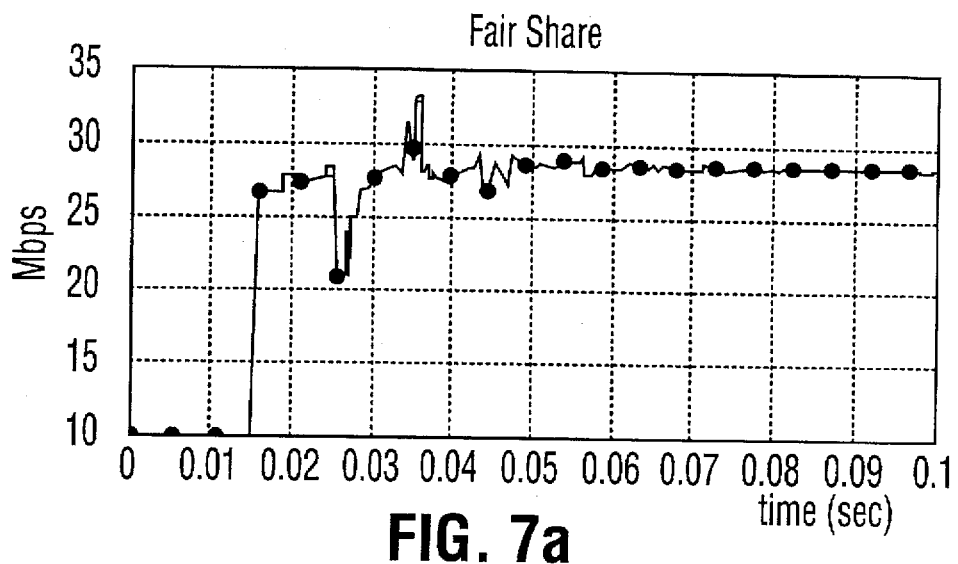
FIGS. 7a, 7b and 7c are results of still another simulation.
Figure 7B:
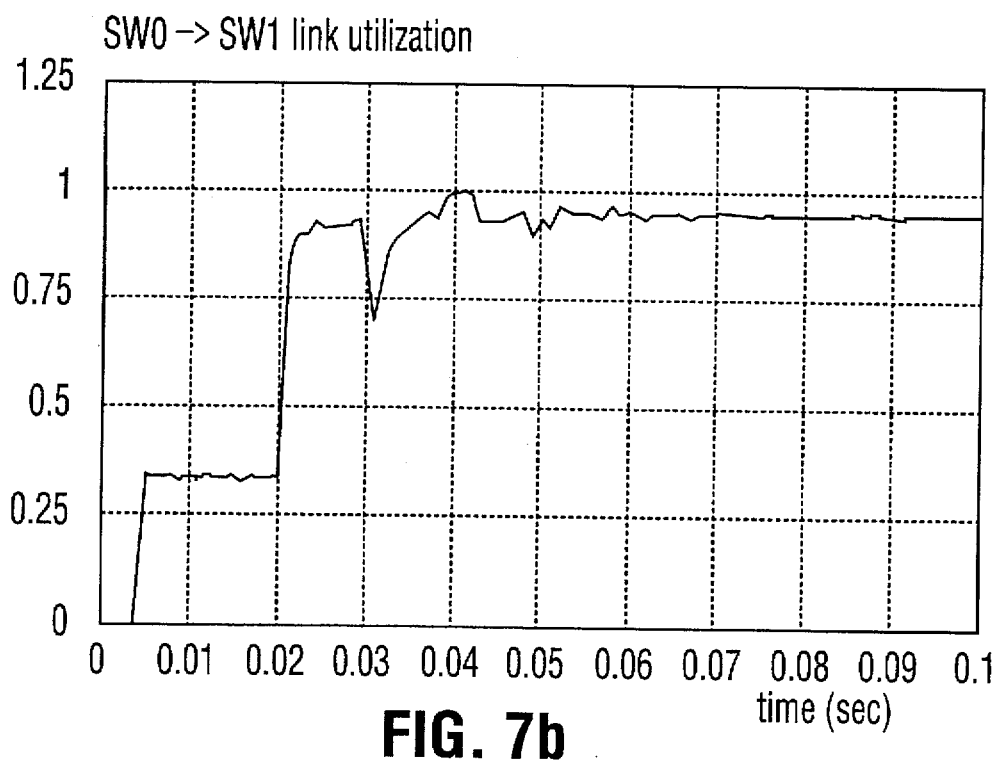
Figure 7C:
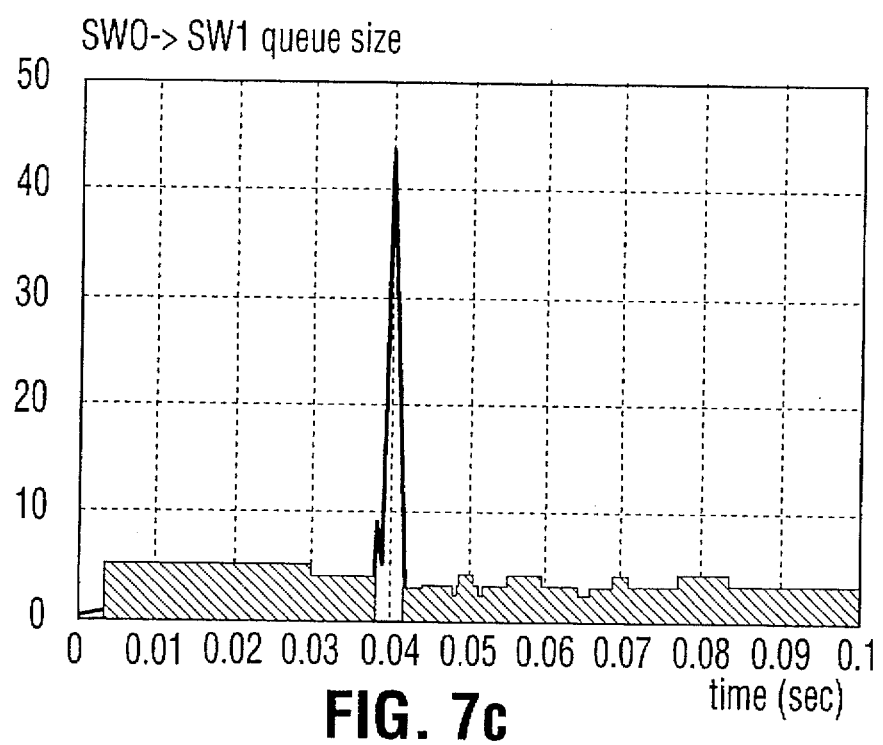
Figure 8A:
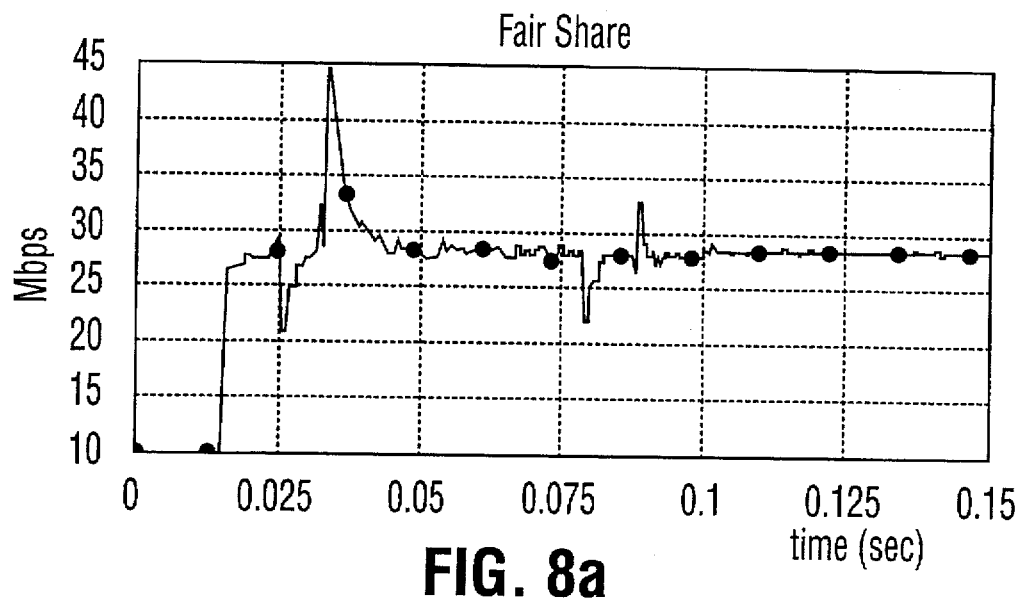
FIGS. 8a, 8b and 8c are results of a yet other simulation.
Figure 8B:
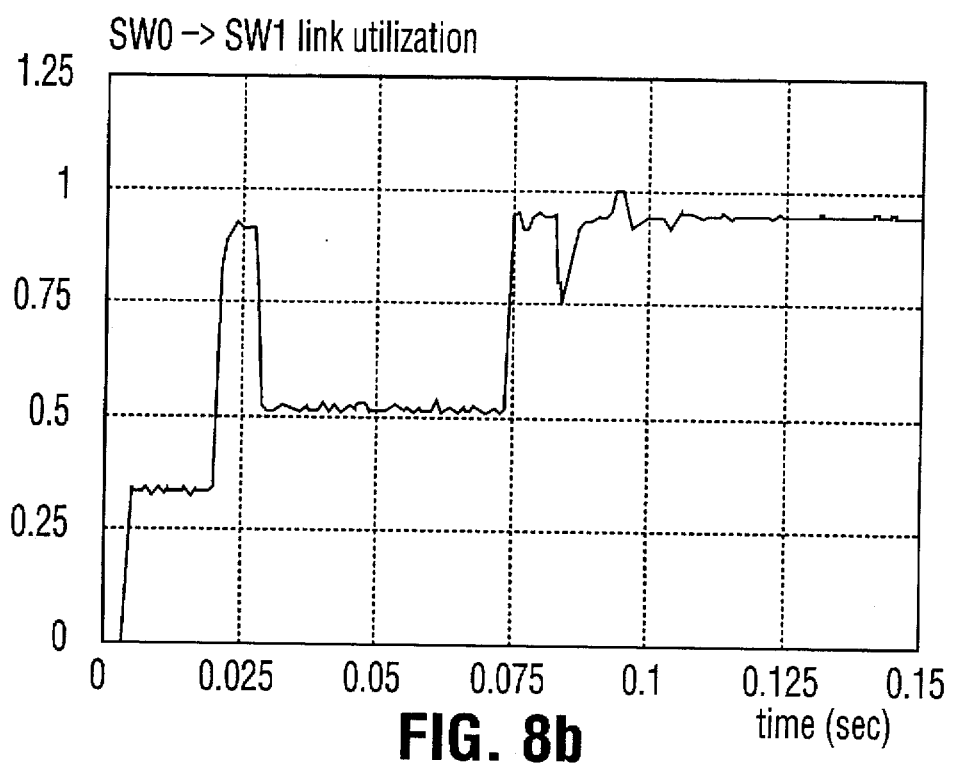
Figure 8C:
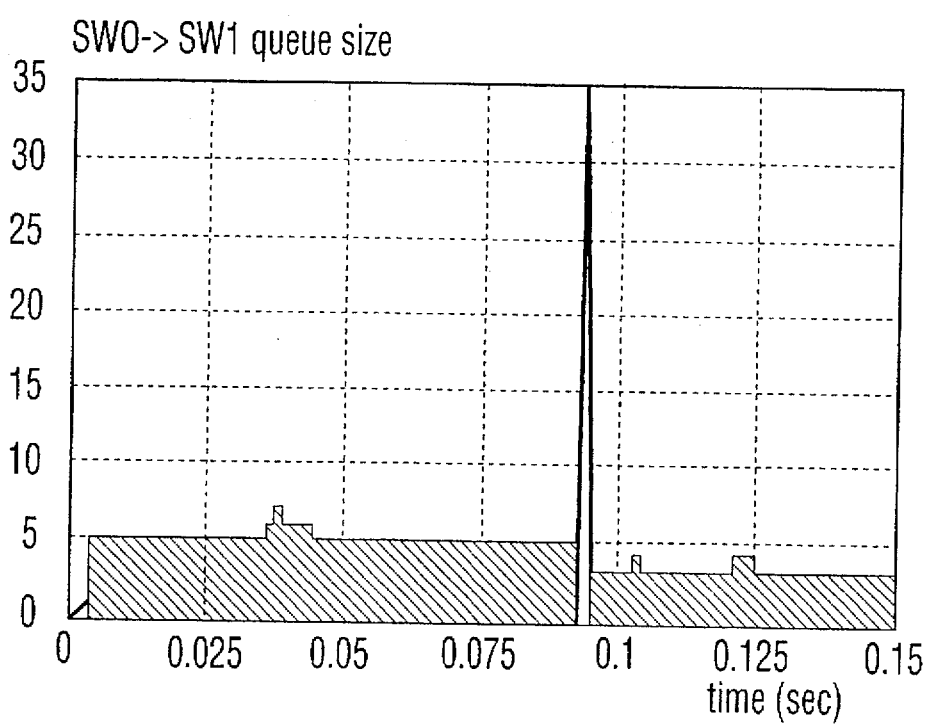

FIGS. 7a-7c and 8a-8c repeat the scenarios of FIGS. 5a-5c and 6a-6c, respectively, but using the actual measured rates per-ABR-VC; i.e. when allocating rates, the measured per-ABR-VC rates are used instead of the CCR fields. It is seen in FIGS. 7a-7c, which use the persistent sources, that the initial ACR overshoot has been reduced in magnitude as compared to that of FIG. 5a-5c. This has caused the peak queue size to be reduced as well.

The more interesting comparison is between cases shown in FIGS. 6a-6c and 8a-8c, all of which use the rate-limited-to-persistent sources. From FIGS. 8a-8c, it is clear that the peak queue size has been dramatically reduced from over 12,500 to less than 35 cells. This is because the ER allocations are now based on the actual measured rates and not on the CCR fields, which may be much larger than the actual rates.

What is claimed is:

1. In an ATM network including one or more ATM switches, a method of controlling the ABR traffic flow on a given link of an ATM switch, comprising the following steps which are performed during a measurement interval of a preset length of time:

obtaining an input rate of the ABR traffic flow, ABR_In_Rate, and an output rate of the ABR traffic flow, ABR_Out_Rate, as well as input and output rates of other service classes, where an input rate refers to the rate of cell arrival and an output rate to the rate of cell departure on the link under consideration;

obtaining a rate available to ABR traffic, Rate_Available_To_ABR;

generating a load factor, LF, by the following equation:

$$LF = Rate\_Available\_To\_ABR/\max(ABR\_In\_Rate, ABR\_Out\_Rate);$$

and adjusting the ABR traffic flow in response to the load factor.

2. The method according to claim 1, wherein the link under consideration has a queue and the step of generating the load factor includes further steps of:

obtaining the arrival rate of ABR cells, ABR_In_Rate, at the queue;

obtaining the departure rate of ABR cells, ABR_Out_Rate, from the queue; and determining the maximum of the ABR_In_Rate and the ABR_Out_Rate.

3. The method according to claim 1, wherein the link under consideration has a queue and the step of generating the load factor includes further steps of:

obtaining the arrival rate of VBR cells, VBR_In_Rate, at the queue;

obtaining the departure rate of VBR cells, VBR_Out_Rate, from the queue;

obtaining the arrival rate of CBR cells, CBR_In_Rate, at the queue;

obtaining the departure rate of CBR cells, CBR_Out_Rate, from the queue; and updating the rate available to ABR traffic, Rate_Available_To_ABR.

4. The method according to claim 3, wherein the step of updating Rate_Available_To_ABR includes further steps of:

determining the amount of reserved bandwidth for VBR traffic;

determining the amount of reserved bandwidth for CBR traffic;

utilizing past history of Rate_Available_To_ABR; and updating Rate_Available_To_ABR using the following equation:

$$Rate\_Available\_To\_ABR = \text{function of } (TCR, \text{queue length}, VBR\_In\_Rate, VBR\_Out\_Rate, CBR\_In\_Rate, CBR\_Out\_Rate, \text{bandwidth reserved for } VBR, \text{bandwidth reserved for } CBR, \text{past history of } Rate\_Available\_To\_ABR),$$

where TCR is a preset target cell rate.

5. In an ATM network carrying ABR traffic including ABR resource management cells called RM cells which carry ER, explicit rate, field and CCR, current cell rate, field, a method of controlling the ABR traffic flow by means of the RM cells for a virtual connection VC, comprising steps of:

receiving forward RM cells;

reading the CCR field of the received forward RM cell;

measuring the actual input rate of the VC, Actual_Rate, on which the forward RM cell has been received;

updating rate and weight averages to be used when allocating rates to the ABR VCs receiving and processing backward RM cells;

generating an explicit rate allocation to be placed in the ER field in a backward RM cell; and sending the backward RM cell containing the allocated rate in the ER field.

6. The method according to claim 5, comprising a further step of:

updating a mean elastic rate, MER, for the link under consideration using both the CCR fields of the received RM cells and the contracted minimum cell rates, MCRs, for the VCs on which forward RM cells are being received.

7. The method according to claim 6, further comprising a step of maintaining a running average of MER.

8. The method according to claim 7, further comprising a step of:

updating MER with every received forward RM cell according to the following equation:

$$MER = MER + Alpha_1 * (CCR \text{ field in received cell} - MCR[vc\_no] - MER),$$

where $Alpha_1$ is a preset weighting constant, and vc_no is the number of the VC on which the forward RM cell has been received.

9. The method according to claim 5, comprising a further step of:

updating a rate average for the VC on which the forward RM has been received, Running_Rate_Average[vc_no], using the CCR field in the received forward RM cell, where vc_no is the number of the VC on which the forward RM cell has been received.

10. The method according to claim 9, further comprising a step of:

maintaining a running average of Running_Rate_Average[vc_no].

11. The method according to claim 10, further comprising a step of:

updating Running_Rate_Average[vc_no] with every received forward RM, according to the following equation:

$$Running\_Rate\_Average[vc\_no] = Running\_Rate\_Average[vc\_no] + Alpha_2 * (CCR \text{ field in received cell} - Running\_Rate\_Average[vc\_no]),$$

where $Alpha_2$ is a preset weighting constant.

12. The method according to claim 5, comprising a further step of:

updating an average of the weights of the ABR VCs passing through the link under consideration, AVW, with every received forward RM cell.

13. The method according to claim 12, further comprising a step of maintaining a running average of AVW.

14. The method according to claim 13, further comprising a step of:

updating AVW with every received forward RM cell, according to the following equation:

$$AVW = AVW + Alpha_3 * (w[vc\_no] - AVW),$$

where $Alpha_3$ is a preset weighting constant, and w[vc_no] is a weight used for vc_no on which the forward RM cell has been received.

15. The method according to claim 5 further comprising steps of:

obtaining input and output rates of the ABR traffic flow as well as input and output rates of other service classes from forward and backward RM cells;

obtaining a rate available to ABR traffic;

generating a load factor, LF, which relates to the rate available to ABR traffic, where an input rate refers to the rate of cell arrival and an output rate to the rate of cell departure on the link under consideration, and wherein the step of receiving and processing a backward RM cell includes the steps of:

comparing the load factor, LF, to a preset threshold, LF_Threshold;

calculating an initial ERS, the rate to be allocated to the VC on which the backward RM cell has been received; and adjusting, if necessary, ERS to bring it within preset acceptable limits.

16. The method according to claim 15, wherein the step of calculating an initial ERS further comprises a step of:

determining whether LF is less than LF_Threshold and, if so, calculating the initial value for ERS using MCR[vc_no], w[vc_no], AVW, and MER, where vc_no is the number of the VC on which the backward RM cell has been received, and MCR[vc_no], w[vc_no], AVW and MER are respectively the contracted minimum cell rates for the VC, a weight for the VC, and an average of the weights of the ABR VCs passing through the link under consideration, and mean elastic rate for the link under consideration.

17. The method according to claim 16, further comprising a step of:

calculating the initial value for ERS according to the following equation:

$$ERS = MCR[vc\_no] + MER*(w[vc\_no]/AVW)*LF,$$

where vc_no is the number of the VC on which the backward RM cell has been received.

18. The method according to claim 15, wherein the step of calculating an initial ERS further comprises a step of:

determining whether LF is greater than or equal to LF_Threshold and, if so, calculating the initial value for ERS using MCR[vc_no], w[vc_no], AVW, LF, MER, and Running_Rate_Average[vc_no], where vc_no is the number of the VC on which the backward RM cell has been received, and MCR[vc_no], w[vc_no], AVW, MER and Running Rate_Average[vc_no] are respectively the contracted minimum cell rates, the VC, a weight for the VC, and an average of the weights of the ABR VCs passing through the link under consideration, mean elastic rate for the link under consideration and a rate average for the VC.

19. The method according to claim 18, further comprising a step of:

calculating the initial value for ERS according to the following equation:

$$ERS = maximum(MCR[vc\_no] + MER*(w[vc\_no]/AVW)*LF, Running\_Rate\_Average[vc\_no]*LF).$$

20. The method according to claim 15, wherein the step of adjusting ERS includes a step of:

executing the following equation:

$$ERS = max(ERS, MCR\_Switch),$$

where MCR_Switch is a preset minimum cell rate applied to all ABR VCs.

21. The method according to claim 15, further comprising a step of:

maintaining a running sum of the latest rates given to ABR VCs, Sum_Of_ERs_Given.

22. The method according to claim 21, further comprising the following steps:

comparing Sum_Of_ERs_Given to the Rate_Available_To_ABR; and adjusting, if necessary, the ERS downwards.

23. The method according to claim 22 comprising further steps of:

comparing (Sum_Of_ERs_Given/Rate_Available_To_ABR) against MOF; and reducing, if necessary, the ERS, where MOF is preset maximum overbooking parameter.

24. The method according to claim 5, further comprising the steps of:

executing the following equation:

$$Actual\_Rate = Nfwd[vc\_no]/(current\ time - Tfwd[vc\_no]);$$

resetting Nfwd[vc_no] to zero; and resetting Tfwd[vc_no] to the current time, where vc_no is the number of the VC on which the forward RM cell has been received, Nfwd[vc_no] is the number of cells received on VC number vc_no since the previous forward RM was received, and Tfwd[vc no] is the time at which the previous forward RM cell was received.

25. The method according to claim 5, further comprising a step of:

updating a mean elastic rate, MER, for the link under consideration using both the Actual_Rate and the contracted minimum cell rates, MCRs, for the VCs on which forward RM cells are being received.

26. The method according to claim 25, further comprising a step of maintaining a running average of MER.

27. The method according to claim 26, further comprising a step of:

updating MER with every received forward RM cell according to the following equation:

$$MER = MER + Alpha_1*(Actual\_Rate - MCR[vc\_no] - MER),$$

where $Alpha_1$ is a preset weighting constant, and vc_no is the number of the VC on which the forward RM cell has been received.

28. The method according to claim 5, further comprising a step of:

updating a rate average for the VC on which the forward RM has been received, Running_Rate Average[vc_no], using the Actual_Rate, where vc_no is the number of the VC on which the forward RM cell has been received.

29. The method according to claim 28, further comprising a step of:

maintaining a running average of Running_Rate_Average[vc_no], where vc_no is the number of the VC on which the forward RM cell has been received.

30. The method according to claim 29, further comprising a step of:

updating Running_Rate_Average[vc_no] with every received forward RM, according to the following equation:

$$Running\_Rate\_Average[vc\_no] = Running\_Rate\_Average[vc\_no] + Alpha_2*(Actual\_Rate - Running\_Rate\ Average\_[vc\_no]),$$

where $Alpha_2$ is a preset weighting constant, and vc_no is the number of the VC on which the forward RM cell has been received.

31. The method according to claim 5, further comprising a step of updating an average of the weights of the ABR VCs passing through the link under consideration, AVW, with every received forward RM cell.

32. The method according to claim 31, further comprising a step of maintaining a running average of AVW.

33. The method according to claim 32, further comprising a step of:

updating AVW with every received forward RM cell, according to the following equation:

$$AVW = AVW + Alpha_3*(w[vc\_no] - AVW),$$

where $Alpha_3$ is a preset weighting constant and vc_no is the number of the VC on which the forward RM cell has been received.

* * * * *